(12) United States Patent
Allalouf et al.

(10) Patent No.: US 8,290,994 B2
(45) Date of Patent: Oct. 16, 2012

(54) OBTAINING FILE SYSTEM VIEW IN BLOCK-LEVEL DATA STORAGE SYSTEMS

(75) Inventors: Miriam Allalouf, Mevaseret-Zion (IL); Muli Ben-Yehuda, Haifa (IL); Julian Satran, Atlit (IL); Itai Segall, Tel-Aviv (IL)

(73) Assignee: International Business Machines Corporation, Armonk, NY (US)

( * ) Notice: Subject to any disclaimer, the term of this patent is extended or adjusted under 35 U.S.C. 154(b) by 224 days.

(21) Appl. No.: 12/773,852

(22) Filed: May 5, 2010

(65) Prior Publication Data

US 2011/0276578 A1    Nov. 10, 2011

(51) Int. Cl.
*G06F 17/30* (2006.01)
(52) U.S. Cl. .......................... 707/821; 707/822
(58) Field of Classification Search .................. 707/821, 707/822
See application file for complete search history.

(56) References Cited

U.S. PATENT DOCUMENTS

| | | | |
|---|---|---|---|
| 5,544,356 A * | 8/1996 | Robinson et al. | 707/821 |
| 7,072,910 B2 * | 7/2006 | Kahn et al. | 707/639 |
| 7,099,900 B1 * | 8/2006 | Bromley et al. | 707/652 |
| 7,243,207 B1 | 7/2007 | Prakash et al. | |
| 7,260,575 B2 * | 8/2007 | Dearing et al. | 707/704 |
| 7,263,108 B2 | 8/2007 | Kizhepat | |
| 7,383,406 B2 | 6/2008 | McBride et al. | |
| 7,392,260 B2 * | 6/2008 | Ren et al. | 707/752 |
| 7,392,261 B2 * | 6/2008 | Clark et al. | 707/821 |
| 7,404,053 B2 | 7/2008 | Kodama et al. | |
| 7,584,279 B1 | 9/2009 | Chapman | |
| 7,606,871 B2 | 10/2009 | Kawamoto | |
| 7,698,334 B2 * | 4/2010 | Kazar et al. | 707/737 |
| 2004/0028068 A1 | 2/2004 | Kizhepat | |
| 2008/0270688 A1 | 10/2008 | Kodama et al. | |
| 2009/0024752 A1 | 1/2009 | Shitomi | |
| 2010/0070544 A1 * | 3/2010 | Gopalan et al. | 707/822 |
| 2011/0302383 A1 * | 12/2011 | Ignatius et al. | 711/162 |

OTHER PUBLICATIONS

Mohammad Banikazemi et al, "Storage-Based Intrusion Detection for Storage Area Networks (SANs)" ,2005, Research Center IBM Research.
Muthian Sivathanu, Lakshmi N. Bairavasundaram, Andrea C. Arpaci-Dusseau, and Remzi H. Arpaci-Dusseau, "Life or Death at Block-Level" Symposium on Opearting Systems Design & Implementation.

* cited by examiner

*Primary Examiner* — Kim Nguyen

(57) ABSTRACT

A computer implemented method is disclosed for obtaining file-level information from block level information of files stored on a storage medium. The method includes accessing the storage medium to obtain metadata available in block level on the storage medium and building an inverse block-to-file map of the files stored on the storage medium. The method also includes listening online to incoming block-level commands communicated from a host to the storage medium, parsing the incoming block-level commands, inferring file-level information from the parsed block level commands; and updating the inverse file-level map. Also disclosed are corresponding computer program product and processing system.

6 Claims, 6 Drawing Sheets

OBTAINING FILE SYSTEM VIEW IN BLOCK-LEVEL DATA STORAGE SYSTEMS

BACKGROUND

The present invention relates to data storage systems. More specifically the present invention relates to obtaining file system view in block-level data storage systems.

A block level storage controller (e.g. Storage Area Network—SAN—controller) controls communications between a host and data storage, using a block-level protocol. The SAN block storage controller interacts with hosts via block-level protocols, such as iSCSI and Fibre Channel (FC). Usually, block-level storage systems do not maintain information specific to the file-system using them. A file system view at the controller, together with the knowledge of which arriving block belongs to which file or mode may leverage many controller applications, such as, for example, storage based intrusion detection that may handle file level threats, semantic data replication, online backup and fine-tuned monitoring. Such view may supply knowledge of association between blocks and the corresponding file to which these blocks belong, and also allow ongoing inference of file-level commands.

An intrusion detection system (IDS) is an appliance or application that monitors network and/or system activities for malicious activities or policy violations. There are two main types of IDS systems: network-based and host-based IDS. In network-based IDS, sensors are located at points in the network to be monitored. The sensors capture all network traffic and analyze the content of individual packets in order to detect malicious traffic. In a host-based system, the sensor usually is a software agent that monitors activity of the host on which it is installed, including file system, log files and the kernel. In storage-based IDS, a sensor captures all the traffic (I/O requests) that arrives at the storage controller, and analyzes possible storage system violations or threats. The very few storage systems that do maintain online IDS are accessed via file-level protocols, such as CIFS or NFS. Application of a block level storage based IDS seem to be far more complicated and does not exist to-date.

Several ways have been suggested to facilitate a file system view at the controller. However these suggestions interfere with the controller I/O path, an approach that suffers from several limitations. First, adding software to the modules that handle the I/O path of a controller is a complicated and error-prone task with heavy development expenses. Second, the CPU capacity at the controller is designed to handle the arriving I/O requests and may not be able to perform additional computation tasks that are required in order to obtain the file-view. Finally, it is much more appealing to add a new external appliance, rather than replacing or patching the existing system.

SUMMARY

According to embodiments of the present invention, there is provided a computer implemented method for obtaining file-level information from block level information of files stored on a storage medium. The method includes accessing the storage medium to obtain metadata available in block level on the storage medium and building an inverse block-to-file map of the files stored on the storage medium. The method also includes listening online to incoming block-level commands communicated from a host to the storage medium, parsing the incoming block-level commands and inferring file-level information from the parsed block level commands; and updating the inverse block-to-file-information map Furthermore, according to embodiments of the present invention, there is provided a computer program product stored on a non-transitory tangible computer readable storage medium for obtaining file-level information from block level information of files stored on a storage medium. The computer program includes code for accessing the storage medium to obtain metadata available in block level on the storage medium and building an inverse block-to-file map of the files stored on the storage medium. The computer program product also includes code for listening online to incoming block-level commands communicated from a host to the storage medium, parsing the incoming block-level commands and inferring file-level information from the parsed block level commands; and updating the inverse block-to-file map.

Furthermore, according to embodiments of the present invention, there is provided a data processing system for obtaining file-level information from block level information of files stored on a storage medium. The system includes a storage system; a host communicating with the storage system, a computer usable medium connected to a processor. The computer usable medium contains a set of instructions designed to be carried out by the processor. The set of instructions includes accessing the storage medium to obtain metadata available in block level on the storage medium and building an inverse block-to-file map of the files stored on the storage medium; listening online to incoming block-level commands communicated from a host to the storage medium, parsing the incoming block-level commands and inferring file-level information from the parsed block level commands; and updating the inverse block-to-file map.

BRIEF DESCRIPTION OF THE SEVERAL VIEWS OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

DETAILED DESCRIPTION

Figure 1:
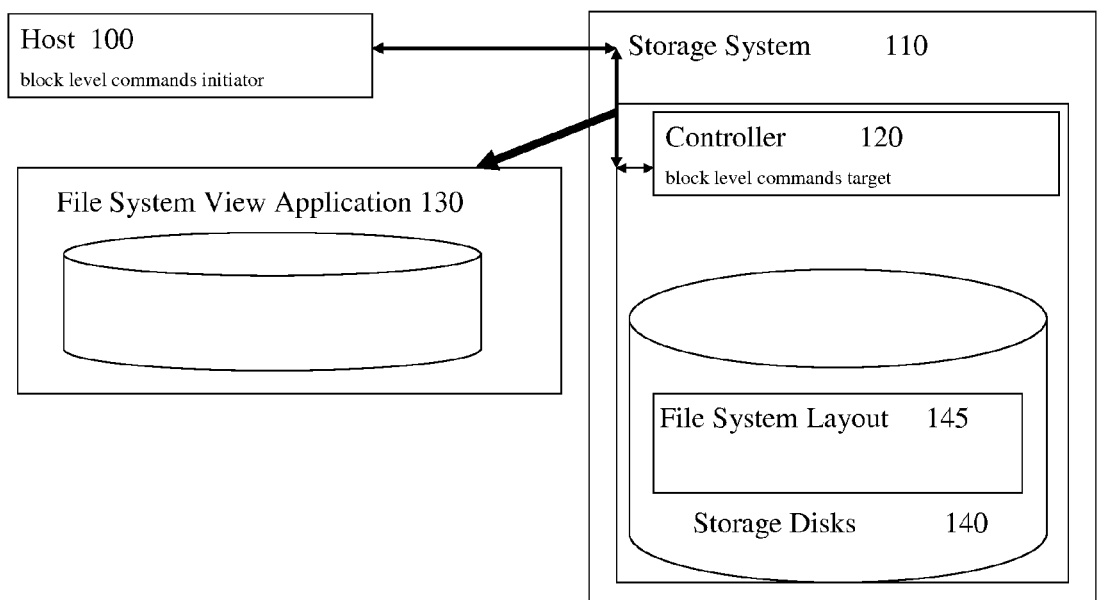
FIG. 1 is a schematic block diagram of a host and a storage system, with a file system view application according to embodiments of the present invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any non-transitory, tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Flowchart/s and block diagram/s in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

According to embodiments of the present invention it is proposed to obtain file level information at a block level storage system by generating an inverse block-to-file map; maintaining and updating online the inverse map;. It is suggested to infer file level commands by parsing the incoming stream of block level commands, while performing this in a listening mode. An inverse block-to-file map may include one or more of the following: block-to-inode map, inode-to-filename map and block-to-filename map. A block-to-file inverse map enables one to answer efficiently questions like: "given a data block number, which inode owns it?" and "what is the filename of this inode?" that are currently not easily answered at storage system level and whose answers are needed for a file-level system awareness at the storage. According to embodiments of the present invention this identification is done in an online manner, by capturing and parsing block-level commands communicated between the host and the storage system.

According to embodiments of the present invention a file system view application listens to block-level storage protocol without interfering with the input-output (I/O) data communications between the host and the storage system. The file system view application may be used to detect, for example, intrusions by passively listening to the block-level commands stream between the host and the storage system without interfering with the host to storage system I/O data path and without adding overhead accesses to the storage system.

Inferring file-level commands from the incoming stream of block-level commands enables one to answer question such as "What was the order, the rate, or the pattern of access inside a specific file?" and "which commands were executed on this file?" Such file system view awareness supplies knowledge of which arriving block belongs to which file.

FIG. 1 is a schematic block diagram of a host and a storage system, with file system view application according to embodiments of the present invention. Host 100 initiates block level commands to store or retrieve data at a storage system 110 that arrive to the block-level protocol target at the storage controller 120. A file system view application 130, which may be located at a remote server or at the storage server itself, listens to the communication of block-level commands. The block-level commands stream between host 100 and storage disks 140 is captured for further processing by the file system view application 130 without interfering and adding requests to the ongoing I/O data flow. Storage disks 140 contain a file system layout 145, i.e., both metadata and data blocks. The layout of the file system at the storage system 110 depends on the file system type that the operating system uses. For example, EXT3 (Third Extended) file provides a system layout with a partition into data block groups. Each data block group contains metadata blocks followed by data blocks. Metadata blocks store information on the structure of the stored files and their hierarchy. Metadata blocks hold an inode table for each inode in a block group. An inode of a regular file points to a list of data blocks making up that file. An inode representing a directory points to data blocks that contain information on inode numbers belonging to the directory, along with their filenames.

Metadata block inode table contains inode attributes and a list of the blocks belonging to each inode. EXT3 data blocks contain regular file data but may also contain additional metadata information such as a directory listing or information regarding indirect addressing of data blocks. EXT3 data blocks that contain pure data are hereinafter termed puredata blocks and data blocks that contain metadata information are hereinafter termed fakedata blocks.

An EXT3 file system allocates puredata blocks and fakedata blocks from the data blocks pool indiscriminately and dynamically, and thus a data block can be a pure data block when associated with one inode, and later (after being freed) reallocated as a fake data block for another inode (and vice versa).

In storage systems today, file system information is organized and stored in storage disks in a way that enables determining file-level information such as association of blocks to a specific inode, but determining the reversed question "given a data block number, which inode owns it?" is difficult. In order to find an inode owning a block given the block number, one must scan the entire inode table until an inode that contains the required data block number is found. Moreover, when a filename is also required, and since the directory hierarchy is kept separate from inode information, an additional inverse mapping has to be resolved and the directory structure must also be found and scanned.

According to embodiments of the present invention, file system view application 130 provides a file system view by performing block-to-inode inverse mapping and by maintaining online an efficient inverse block-to-file map using state machines and keeping track of metadata information only. Parsing the block-level commands that arrive and maintaining the inverse block-to-file map allow identifying the association of each block in the file system layout. A block-to-inode inverse map holds all the allocated valid data blocks and inodes of the file system where each data block points to the directory or file inode that holds it.

Figure 2:
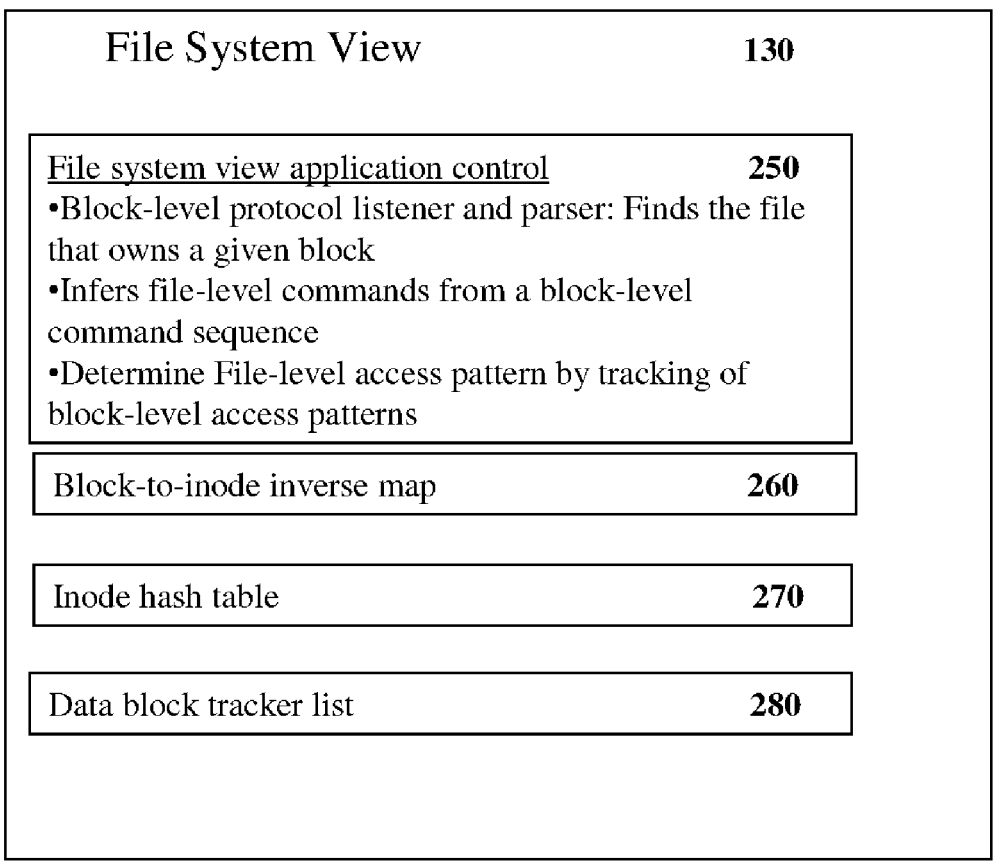
FIG. 2 is a schematic block diagram of a file system view application according to embodiments of the present invention.

FIG. 2 is a schematic block diagram of a file system view application according to embodiments of the present invention. The file system view application 130 includes application control code 250 and three data structures that store information using state machines and keep track of metadata information. The file system view application control 250 implements a block-level protocol listener and parser that identifies the semantic meaning of each arriving block, constructs the state machine to find the inode or file that owns a given block, infers file-level commands from a block-level command sequence and determines the file-level access pattern by tracking the block-level access patterns. The file system view 130 implements three data structures: block-to-inode inverse map 260, inode hash table 270 and data block tracker list 280 where the inverse block-to-file map occupies less memory than memory required for copying the entire storage disk 140.

According to embodiments of the present invention, file system view application 130 performs the following steps: it captures block-level commands, identifies the type of the Internet Small Computer System Interface (iSCSI) command and the type of the block specified in the command, inserts the relevant information to the data structure that reflects the state machine logic and finally adds the block-to-inode information to an inverse map.

Block-to-inode inverse map 260 may include the numbers of all the allocated data blocks in the file system, their type in the file system (e.g. puredata, metadata or fakedata) and their associated owning inodes. The block-to-inode inverse map may be built, for example, as a physical data structure type B-Tree such that given a block number, its associated owner inode can be determined efficiently. The keys in this B-Tree are consecutive ranges of data blocks of the same type and are owned by the same inode, and the values are the inode structures. Note that not all block keys should be inserted into the tree, and only start and end ranges may be inserted. The block-to-inode inverse map contains only valid blocks pointing to valid inodes such that the inode number of a given data block number can be fetched efficiently, answering the question: "given a data block number, which inode owns it?" and a file level awareness and semantics are thus enabled at the storage controller level and may be used to detect intrusions to the file system.

Data block tracker list 280 holds a list of the data blocks that were encountered and that can not yet be associated with any of the inode with certainty. For each such data block, the state (valid, semi-valid or delete) and the block content is kept temporarily until its ownership and type is determined and registered in the corresponding state machines. The blocks content of the data block tracker list is kept since if a block contains metadata information, its data has to be further parsed and processed and only after it is inferred and registered in the corresponding state machines it can be deleted. When working with self-contained epochs (to be explained later), the content of the data block tracker list is deleted after each parsing epoch is complete.

Inode hash table 270 holds a list of the inodes that exist in the storage system, either valid or semi valid. An inode is considered valid when its corresponding state machine is in a valid state. An inode is considered semi valid when its corresponding state machine is in an intermediate state (see also FIG. 4 and corresponding explanation hereinafter). For each inode, an inode structure that contains the inode state, type and other attributes are stored at the state machine. An inode is deleted from the Inode hash table when its state machine transits it to a deleted state.

Each file-level command is usually translated into several block-level commands in order to update the information stored in the metadata blocks in the storage disks according to a typical block level protocol. For example, a file-level command for the EXT3 file system that creates a new file at the storage disk is translated at the initiator host to the following block level commands that update both metadata and pure data blocks: (1) update the stored super block fields specifying the number of allocated blocks and inodes, (2) update the stored field in the group descriptor of the appropriate block group specifying the number of free inodes, (3) set the relevant bit in the inode bitmap to true, (4) set the relevant bits in the data bitmap to true, corresponding to the additional data blocks that were allocated for this file, (5) create a new inode structure in the inode table, (6) update the access time fields in inode structure of the parent directory, (7) add the filename to the relevant data block of the parent inode, and finally, (8) write the data blocks of this inode.

According to embodiments of the present invention, these block-level commands are captured and inferred to maintain an updated file system view at the storage controller or at a remote server and to identify which arriving block belongs to which file or inode.

Figure 3:
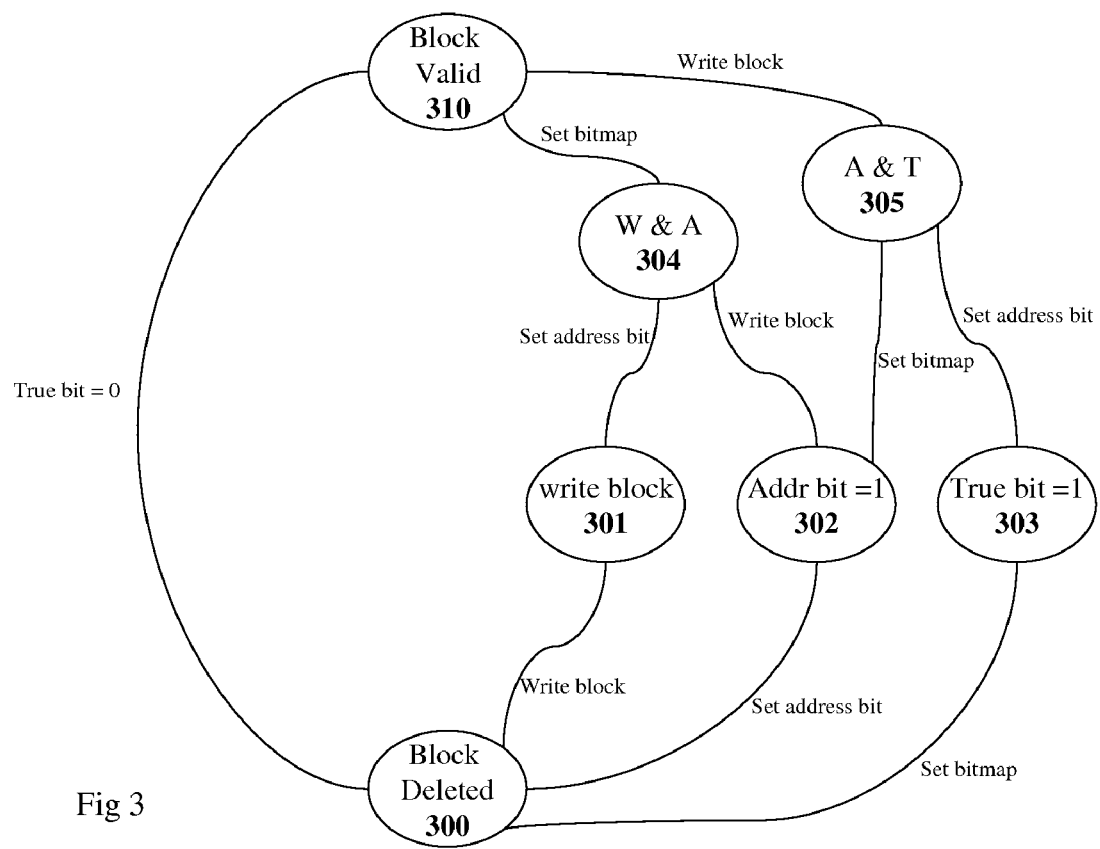
FIG. 3 illustrates a data block state machine according to embodiments of the present invention.

FIG. 3 illustrates a data block state machine according to embodiments of the present invention. A data block state machine transits to valid state 310 and enters the block-to-inode inverse map according to incoming captured and inferred block level commands and according to the corresponding state machine current state. Three block-level commands need to be parsed and inferred, independent of their arrival order, in order to get the state machine transit to a valid state: a. a write command to this specific data block 301, b. a write command that set to "true" the address bit of this specific data block 302, and c. a write command that set to "true" the corresponding bit in the block bitmap 303. After one, out of the three block-level commands, has arrived and a transition was performed accordingly to an intermediate states 301-303, the state machine waits for the next command to arrive and transits to states W & A 304 or state A & T 305 accordingly. From these two intermediate states, a transition to a valid state 310 occurs when the appropriate inferred block-level command arrives next. When a transition to valid state occurs the block is registered at the block-to-inode inverse map and a new block are determined. When a transition to intermediate state occurs the block is registered at the data block tracker list. The data block state machine holds relevant data block information such as the data block type which is important for achieving file level awareness.

A data block is deleted 300 after a block level-command is captured and inferred that set to false the corresponding bit in the data block bitmap. After validation or deletion of a data block the block-to-inode inverse map and the data block tracker list are updated accordingly.

Figure 4:
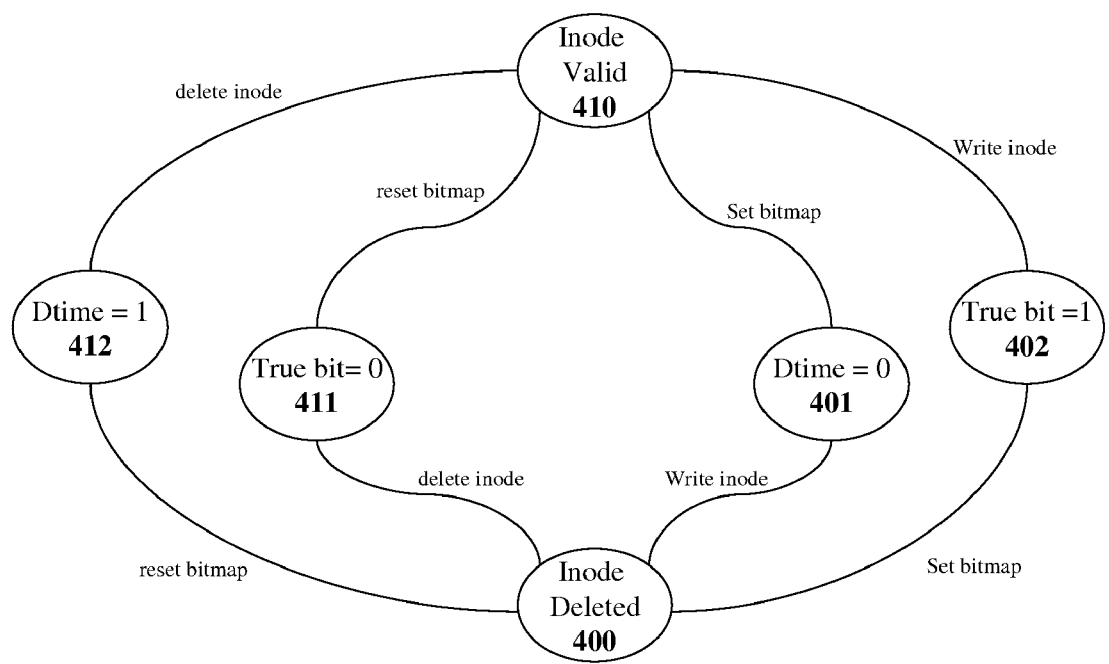
FIG. 4 illustrates an inode state machine according to embodiments of the present invention.

FIG. 4 illustrates an inode state machine according to embodiments of the present invention. An inode state machine transits to a valid state 410 and enters the inode hash table according to incoming captured and inferred block level commands and according to the corresponding state machine current state. Two block-level commands need to be parsed, independent of their arrival order, in order to reach a valid state: a. a write command to this specific inode with dtime field equal to zero 401, b. a write command to the corresponding bit in the inode bitmap 402. After the second complementary write command has arrived, the state machine transits to valid state 410. When a transition to intermediate states, 401 and 402, occurs the inode is registered at the inode hash table. When a transition to valid state 410 occurs the inode remains registered at the inode hash table. The inode state machine holds relevant attributes relating to the inode such as the inode type, pointing to a file or to a directory, which are important information for achieving file level awareness.

An inode is deleted 400 in two stages. First a transition to states 411 or 412 occurs after a corresponding block level command is captured and inferred with a non-zero dtime field or the command set to "false" the corresponding bit in the inode bitmap. Next, when the complementary command is captured the state machine transits to a deleted state 400. After validation or deletion of an inode, the block-to-inode inverse map and the inode hash table are updated accordingly.

In order to identify creation of new inodes and data blocks, a file system view application according to embodiments of the present invention maintains state machines for inodes and blocks that were encountered but were not yet validated in a separate data structures, the data block tracker list and the inode hash table, in addition to the main block-to-inode inverse map that hold only valid inodes and valid data blocks. Accordingly, when an inode or a data block state machine transit to a valid state a creation of new inode or data block is determined and the new inode or data block is registered in the block to inode inverse map.

The data block and inode state machines illustrated in FIG. 3 and FIG. 4, allow the file system view inference process according to embodiments of the present invention to identify correctly the creation of a new file, the deletion of a file and the addition of a new data block or its removal.

A file system view online inference process according to embodiments of the present invention may be used to detect unauthorized intrusion to the storage medium. Unauthorized intrusions that may be detected may include, for example, modifying data or metadata that belongs to files that system adminstrators expect to remain unchnged, accessing with a suspicious pattern certain files or the file system, taking up all or most of the storage free space by allocating many inodes or other metadata structures causing a storage denial-of-service.

Since a file-level command is translated into several block-level commands that may be delayed and interleaved and may be flushed to the storage system in any order, re-ordering of the arriving commands is needed where metadata blocks that contain the file level information are parsed and inferred first. Accordingly, a self-contained epoch is used, according to embodiments of the present invention, where all block commands that are related to a certain set of data blocks are found within the self-contained epoch. Through the self-contained epoch, parsing of data blocks is delayed and parsing of metadata blocks is performed first.

EXT3 file system is an example of file systems whose view can be obtained according to embodiments of the present invention. According to embodiments of the present invention block level commands are captured and the role of each block is identified with regard to EXT3 layout. An inode structure in EXT3 that represent a regular file points to a list of data blocks making up that file. An inode structure representing a directory points to data blocks that contain information on inode numbers that belong to the directory, along with their filenames. Thus part of EXT3 data blocks are fake data blocks since they hold metadata-like information (such as inode directory or indirect addressing data blocks). The file system allocates pure blocks and fake blocks from the data blocks pool indiscriminately, and thus a data block can be a pure data block when associated with one inode, and later (after being freed) reallocated as a fake data block for a different inode (and vice versa). Furthermore, since the only way in EXT3 to differentiate between pure data and fake data blocks at the block level is by identifying their correct inode association and their role within that inode, pure data and fake data blocks parsing are delayed until parsing and inferring of the relevant metadata blocks are performed.

In order to identify the end of the parsing epoch in the EXT3 file system, a journal end-of-transaction finish message is used as an indication. The EXT3 file system is a journaled file system that uses journal mode affecting the order in which block level commands are flushed to the disk and logs information that can be recovered later from the journal in case of failure. In the EXT3 journal mode, all file system data and metadata changes are logged into the journal which minimizes the chance of losing updates made to each file, but it requires many additional disk accesses. Another mode used by EXT3 is an ordered mode that logs only changes to file system metadata. In the EXT3 ordered mode, puredata blocks are flushed to the disk before performing the actual metadata modifications. Each journaling transaction is accompanied by a T_FINISHED entry that indicates that flushing of data blocks to disk switches from puredata blocks to metadata blocks (including both metadata and fake data blocks).

According to embodiments of the present invention a self-contained epoch is defined according to the file system T_FINISHED entry initiated by the host when switching from flushing puredata blocks to flushing metadata blocks to disk. Next, the blocks are ordered and metadata blocks are parsed and inferred first while fakedata blocks are parsed after the metadata blocks. Puredata blocks do not contain system level information and are not parsed.

Figure 5:
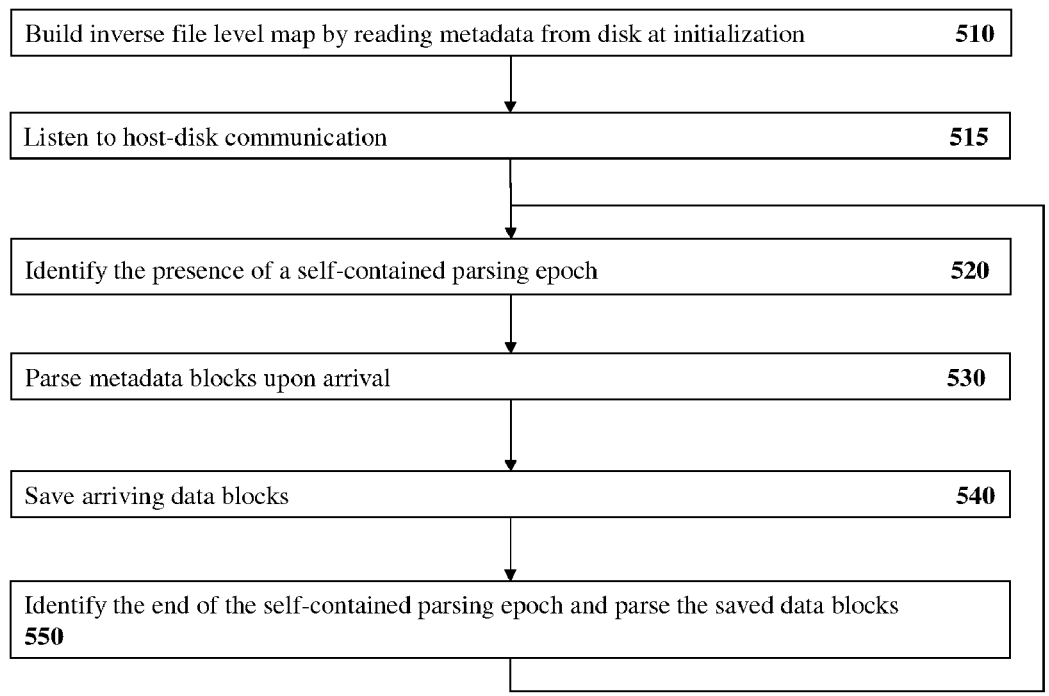
FIG. 5 is a flow chart diagram of a file system view application using a self-contained parsing epoch according to embodiments of the present invention.

FIG. 5 is a flow chart diagram of a file system view application using a self-contained parsing epoch according to embodiments of the present invention. Block-to-inode mapping is obtained first by building an inverse file level map 510. In order to build the file system view, metadata is read from the storage system disk and the relevant information is inserted into data structures 260 state machines (see FIGS. 3 and 4 and corresponding explanation in the present specification). This step is performed once at system initialization. Next, the file system view application listens to host-disk communications 515 and identifies the presence of a self-contained parsing epoch 520. The metadata blocks are parsed first 530 while data blocks are stored and their parsing is delayed to the end of the self-contained parsing epoch 540. After the metadata blocks are parsed and inferred an end of the self-contained parsing epoch is identified, the saved data blocks are parsed 550 and fakedata blocks metadata information is stored 560 using data structures 260, 270 and 280 that implement state machines for each data block and inode.

Figure 6:
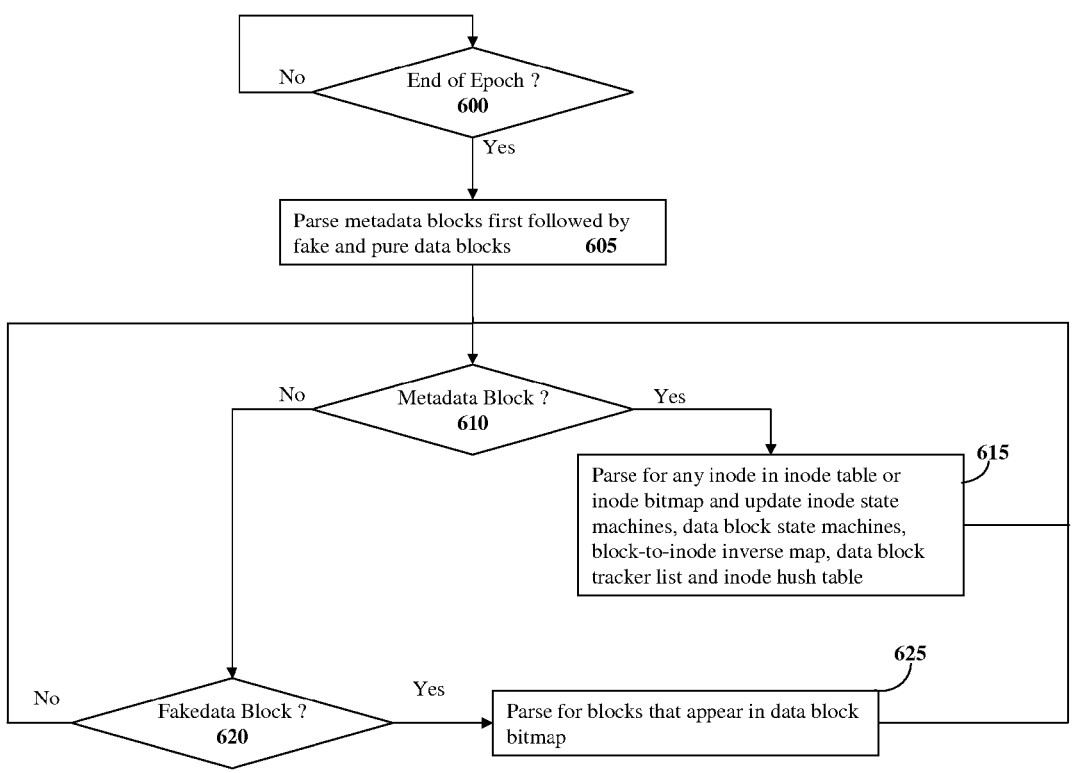
FIG. 6 is a flow chart diagram of a file system view inference process of block level commands according to embodiments of the present invention.

FIG. 6 is a flow chart diagram of the EXT3 file system view inference process of block level commands according to embodiments of the present invention. A file system view application according to embodiments of the present invention waits for a T_FINISHED entry to be received from the host indicating that an end of self-contained parsing epoch of flushing puredata blocks from host to disk occurred 600. Metadata blocks received at the current journal parsing epoch are parsed first while fakedata and puredata blocks are stored and parsed at the end of the parsing epoch 605. Metadata blocks are parsed 610 and information relating to the inode which is accessed, and relating to the block level command which is performed (for example, set the true bit in an inode bitmap, write a non-zero value to the inode dtime field or any other iSCSI commands) are inferred and the corresponding state machines are managed accordingly 615. Data block state machine, block-to-inode, inode hash table and data block data tracker list may be modified in this step. After parsing all the metadata blocks, the fakedata blocks are parsed 620 and the parsed information is registered at the data structures state machines accordingly 625.

The flow chart of FIG. 6 illustrates how block-level commands parsing and inferring in each self-contained parsing epoch allows maintaining online a file system view and inferring file-level commands that enables unauthorized intrusion detection at the storage medium.

Additional data structures (maps) and state machines could be maintained to answer the question: "What was the exact filename that is related to a certain inferred host-level command, given an inode?".

Specifically in EXT3, when using hard links there may be several different filenames to the same inode The files that belong to a directory are listed in data blocks that are associated with the directory inode. These data blocks hold an unsorted list of records, one record for each filename. The record keeps the filename and its inode ID. A directory that has a large number of files can span over many data blocks. In order to discover whether a new filename was added or deleted to the list, a copy of the entire directory hierarchy is kept by the listener application. A creation of a new link at the host-level is translated into two block-level write commands: a) a write command to a data block that belongs to the parent directory with the additional filename (hard link) added to the list. b) a write command to the inode table, in which the link counter of the inode is updated. To find out which filename was added and to which inode it relates, one may review the list written to the directory data block, and add any previously unknown filename to the data structures.

What is claimed is:

1. A computer implemented method for obtaining file-level information from block level information of files stored on a storage medium, the method comprising:

intercepting block-level commands initiated by a host to access data blocks on a data storage medium connected to the host over a data communication network, wherein an inverse block-to-file map of files stored on the data storage medium is constructed to provide an association between a first data block in th data storage medium and a file name having a respective inode, wherein a file identified in a file directory by said file name and inode includes first data stored in the first data block;

parsing the incoming block-level commands initiated by the host, independent of arrival order of the block-level commands, to determine transitions between valid and invalid states in at least one of a first state machine and a second state machine, wherein the first state machine tracks a first plurality of related incoming block-level commands to determine if a data block has been created or deleted, and wherein the second state machine tracks a second plurality of related incoming block-level commands to determine if an inode associated with a filename is to be registered to indicate the creation or deletion of a file directory;

inferring file-level information from the parsed block level commands to detect unauthorized access to the data storage medium based on identifying modifications to data or metadata, stored on the data storage medium, that are expected to remain unchanged; and updating the inverse block-to-file map.

2. A computer implemented method as claimed in claim 1, wherein the inverse block-to-file map is selected from the group of block-to-file map information comprising one of block-to-inode map, inode-to-filename map or block-to-filename map.

3. A computer implemented method as claimed in claim 1, comprising determining file-level access patterns from block-level access patterns by tracking the incoming block-level commands.

4. A computer implemented method as claimed in claim 1, wherein the inferring of file-level information from the parsed block level commands includes using state machines.

5. A computer implemented method as claimed in claim 4, comprising using a physical data structure type representing logic of the state machines.

6. A computer implemented method as claimed in claim 4, wherein the physical data structure type is one of a B-tree, a hash table or a list.

* * * * *